Oct. 16, 1951 M. KASSAN ET AL 2,571,891
COOKING APPARATUS FOR WAFFLES AND THE LIKE
Filed Dec. 2, 1949 2 SHEETS—SHEET 1
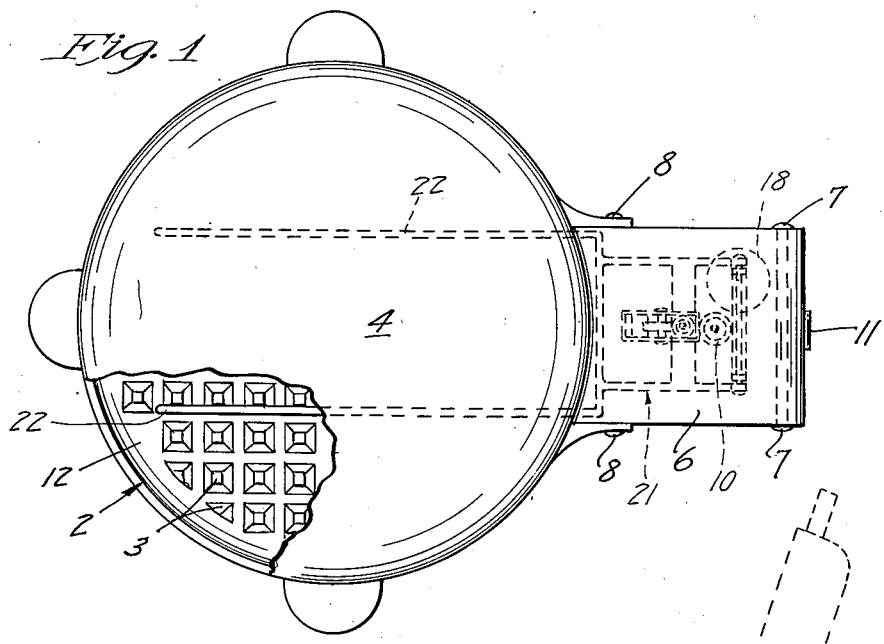
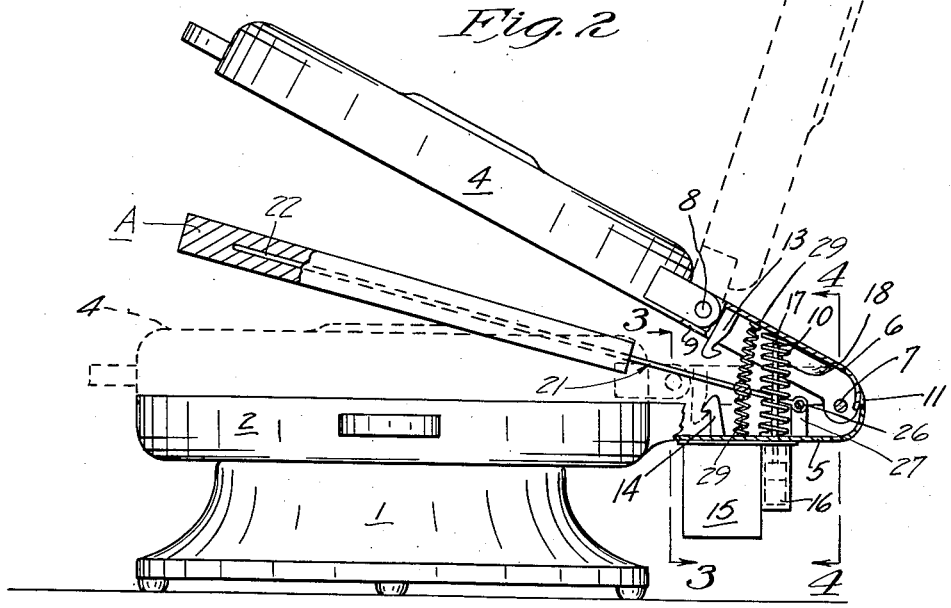
Inventors
Michael Kassan
John W. Kassan
By their Attorneys
Merchant & Merchant Oct. 16, 1951  M. KASSAN ET AL  2,571,891
COOKING APPARATUS FOR WAFFLES AND THE LIKE
Filed Dec. 2, 1949  2 SHEETS—SHEET 2
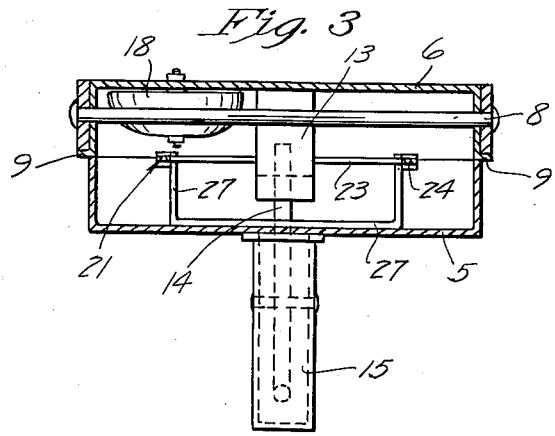
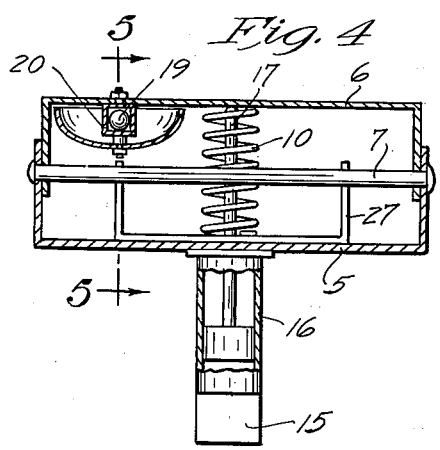
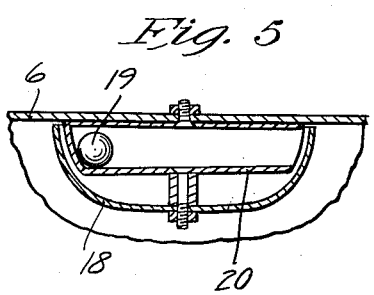
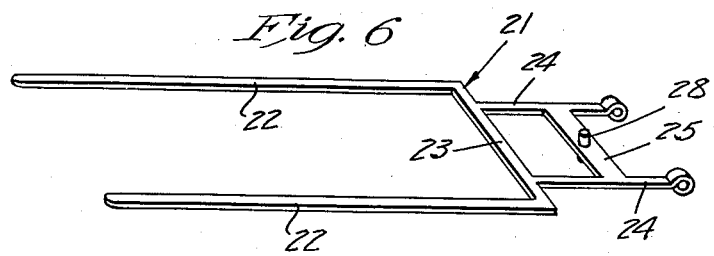
Inventors
Michael Kassan
John W. Kassan
By their Attorneys
Merchant & Merchant Patented Oct. 16, 1951

2,571,891

UNITED STATES PATENT OFFICE 2,571,891

COOKING APPARATUS FOR WAFFLES AND THE LIKE

Michael Kassan, South St. Paul, and John W. Kassan, St. Paul, Minn.

Application December 2, 1949, Serial No. 130,736

1 Claim. (Cl. 99—373)

Our invention relates generally to cooking apparatus and, more specifically, to cooking apparatus of the type having opposed relatively movable heating plates which define a cake-cooking chamber when in face-to-face relation.

An important object of our invention is the provision of means for separating a cake, cooked between the plates of a cooking apparatus as set forth, from said plates when the plates are moved to a spread-apart relationship.

Another object of our invention is the provision of means for separating a cake from the heating plates above-described and for supporting the cake between said plates and in spaced relation thereto when said plates are in spread-apart relationship.

Another object of our invention is the provision of yielding means biasing said means for separating the cooked cake from the heating plates to said position intermediate the spread-apart heating plates.

Another object of our invention is the provision of cooking apparatus as set forth having a tine interposed between the heating plates and adapted to be imbedded within a cake cooked in the cooking chambers defined by the plates.

A still further object of our invention is the provision of cake-cooking apparatus as set forth, wherein the heating plates are yieldingly biased to a pre-determined angularly spread-apart distance, and manually movable therebeyond to a greater predetermined distance.

Another object of our invention is the provision of cooking apparatus of the above type, wherein the opposed heating plates are yieldingly biased toward a spaced-apart relationship and held against said yielding bias in substantially face-to-face relationship during the cooking operation.

Another object of our invention is the provision of dashpot means for retarding movement of the heating plates toward their spread-apart positions.

Another object of our invention is the provision of cooking apparatus of the above type, the heating plates thereof having opposed spaced rows of waffle-forming lugs, and a fork element having tines extending between adjacent rows of lugs.

Other highly important objects and advantages of our invention will become apparent from the following detailed specification, appended claim, and attached drawings.

Referring to the drawings, wherein like characters indicate like parts throughout the several views:

Fig. 1 is a plan of a waffle iron incorporating our invention, some parts being broken away;

Fig. 2 is a view in side elevation, some parts being broken away and some parts being shown in section;

Fig. 3 is an enlarged vertical section taken substantially on the line 3—3 of Fig. 2;

Fig. 4 is an enlarged vertical section taken substantially on the line 4—4 of Fig. 2;

Fig. 5 is an enlarged fragmentary detail, taken substantially on the line 5—5 of Fig. 4; and Fig. 6 is a view in perspective of the cake-supporting fork element of our invention.

Referring with greater particularity to the drawings, the numeral 1 indicates a base upon which is rigidly mounted a relatively stationary heating plate or the like 2. The heating plate 2 is maintained at a desired set temperature by electrical resistance wire not shown but mounted therein in the conventional manner. Further, the heating plate 2 may be of any of the conventional type but preferably and as shown is provided with spaced parallel rows of upstanding lugs 3, whereby to form waffles or the like. A cooperating relatively movable heating plate 4 overlies and is adapted to move into and out of face-to-face relation with and relatively stationary plate 2. The plate 4 is also provided with spaced parallel rows of waffle-forming lugs which oppose the lugs 3 of the stationary plate 2 when the plates 2 and 4 are in face-to-face relationship.

A tongue-like hinge element 5 is rigidly secured to the peripheral edge portion of the stationary plate 2 and projects radially outwardly therefrom. A similar tongue 6 projects radially outwardly from the peripheral edge of the upper movable plate and, at its outer end, is pivotally secured to the outer end portion of the tongue 5 by a hinge pin or the like 7. As shown, the tongue 6 is pivotally secured to the movable heating plate 4 by a hinge connection 8, the axis of which is parallel to the axis of the hinge pin 7, for a purpose which will hereinafter become apparent.

A pair of laterally-projecting ears 9 on the tongue-like hinge element 6 limit pivotal movements of the movable heating plate 4 in one direction with respect to the hinge element 6. A coil compression spring 10 interposed between the hinge elements 5 and 6 biases the heating plates 2 and 4 toward an angularly spread-apart relationship about the axis of the hinge pins 7. A stop lug 11 on the hinge element 6 engages the extreme outer end portion of the hinge element 5, whereby to limit movement of the movable plate 4 away from the plate 2 to an angle of less than ninety degrees, as indicated by full lines in Fig. 2. As shown by one set of dotted lines in Fig. 2, the heating plate 4 is manually movable beyond the spring-biased open position thereof to an angle greater than ninety degrees from the face-to-face position of the heating plates, as indicated by a second set of dotted lines is Fig. 2.

When the movable plate 4 is in face-to-face relationship with the stationary plate 2, said plates cooperate to define a cake-cooking chamber 12 and are maintained in this position by engagement of a relatively stationary hook-like element 13 rigidly secured to the tongue 6 by a relatively movable hook element 14 operatively associated with the tongue 5. The hook element 14 is mounted for lateral swinging movements into and out of engagement with the hook element 13 in a casing 15 which contains timing mechanism not shown. The timing mechanism is conventional in character and may be mechanically or thermostatically operated. However, this mechanism forms no essential part of the instant invention and it is thought that detailed disclosure thereof is unnecessary. A dashpot cylinder 16 is rigidly secured to the tongue-like hinge element 5 and has projecting upwardly therefrom a piston-equipped plunger rod 17, the upper end of which is secured to the tongue-like hinge element 6. The dashpot operates as a cushioning element to retard the opening movement of the movable heating plate 4 against bias of the compression spring 10.

A gong or bell 18 is secured to the tongue 6 and is adapted to be struck by a ball or the like 19 mounted in a track or the like 20 when the cooking or baking operation is completed. With reference to Fig. 5, it will be seen that the track 20 slopes in a direction to move the ball 19 by gravity away from engagement with the bell 18 when the movable heating plate 4 is in operative engagement with the heating plate 2. However, when the cooking or baking operation is completed and the timing mechanism within the casing 15 disengages the hook element 14 from the hook element 13, upward movement of the heating plate 4 and tongue-like hinge element 6 will tilt the track 20 in a direction to cause the ball 19 to strike the bell 18, thereby warning the operator that the cake or waffle being baked is finished.

A fork element 21 comprises a pair of laterally-spaced tines 22 connected at one of their ends by a cross member 23, and a pair of laterally-spaced arms 24 projecting rearwardly from the cross member 23 and connected intermediate said member 23 and their outer ends by a second cross member or bar 25. At their free ends, the arms 24 are provided with axially-aligned hinge elements through which extends a hinge pin 26 supported adjacent its opposite ends by a bracket 27. The hinge pin 26 is in spaced parallel relationship to the hinge pin 7 and the tines 22 project outwardly at right angles with respect thereto. The tines 22 each project into the chamber 12 when the heating plates 2 and 4 are in face-to-face relationship and each lies between adjacent rows of the grid-forming lugs or bosses 3 becoming imbedded within the cake or waffle batter placed in the chamber 12. A pin 28 projects generally upwardly and downwardly from opposite sides of the bar 25 intermediate the arms 24 and anchors a pair of opposed coil compression springs 29 interposed between opposite sides of the bar 25 and the tongue-like hinge elements 5 and 6, whereby to center the fork element 21 between the heating plates 2 and 4 in their face-to-face relationship as well as in their spread-apart condition. When batter placed in the chamber 12 is cooked or baked to a finished waffle or cake, as indicated by A, and the heating plates 2 and 4 moved to their full line position of Fig. 2, the springs 29 exert yielding bias upon the fork element 21 to center the same and the cake A thereon between the heating plates 2 and 4. The cake A may be then withdrawn from supporting engagement of the tines 22 therewith. Either of the springs 29 exert sufficient yielding bias upon the fork element 21 to remove the cake or waffle A from either of the heating plates 2 or 4 in the event that the cake should adhere thereto. However, the springs 29 are not sufficiently strong to cause the tines 22 to break through the cake or waffle A, in the event that the waffle should adhere to either of the plates 2 or 4 to an extent to overcome the bias of one of the springs 29. The fork element 21 is preferably stamped out from a single piece of sheet material, such as stainless steel or the like, and is made relatively smooth so that the cake or waffle A may be easily withdrawn therefrom.

In use, the movable heating plate 4 is manually moved to its open dotted line position of Fig. 2 and the required amount of cake or waffle-forming batter poured onto the lower plate 2. The movable plate 4 is then moved to its closed dotted line position of Fig. 2, where it is maintained closed against bias of the spring 10 by engagement of the hook element 13 by the movable hook element 14. When the heating plates 2 and 4 are moved to their face-to-face closed position, the tines 22 of the fork element 21 become imbedded in the cake-forming batter within the chamber 12, and the cake or waffle A becomes baked therearound. Upon completion of the baking or cooking period, the mechanism within the casing 15 releases the hook element 14 from the hook element 13, and the spring 10 moves the movable heating plate 4 to its full line position of Fig. 2, the speed of opening movement of the movable plate 4 being regulated by the dashpot 16. Upward movement of the movable plate 4 and its tongue-like hinge element 6 causes the ball 19 to roll into striking engagement with the bell 18 and warns the operator that the waffle A is baked to the desired extent. The springs 29 move the waffle out of engagement with the heating plates 2 and 4 and cause the same to be suspended approximately centrally thereof. If desired, the waffle or cake A may be left on the fork element 21 for any desired length of time, heat radiating from the heating plates 2 and 4 maintaining the waffle A in a warm condition. When it is desired to remove the waffle from the tines 22 of the fork element 21, the upper movable heating plate 4 may be moved to its open dotted line position of Fig. 2 and the waffle A detached from the tines 22 with a laterally-outward sliding movement, after which the operation may be repeated by adding more batter to the top surface of the stationary plate 2.

From the above, it will be seen that we have provided a cake or waffle-cooking apparatus which is fully satisfactory in the accomplishment of the objectives set forth; and, while we have shown a commercial embodiment of our novel apparatus, it will be understood that the same is capable of modification without departure from the spirit and scope of the invention as defined in the claim.

What we claim is:

In a device of the class described, upper and lower cooperating heating plates having aligned radially-projecting tongues, said tongues being pivotally secured together adjacent their outer ends, said plates being movable toward and from each other about the axis of said pivotal connection and defining a cake-cooking chamber therebetween when in face-to-face horizontally-disposed relationship, a fork element mounted for pivotal movements intermediate said heating plates on an axis parallel to the axis of pivotal connection between said tongues, yielding means biasing said upper plate and tongue toward a spaced apart angular relationship with respect to said lower plate less than ninety degrees, independent yielding means biasing said fork element toward an intermediate position in relation to said plates when said plates are in said spread apart relationship, and a pivotal connection intermediate the upper heating plate and the inner end of its cooperating tongue permitting limited pivotal movements of said upper plate with respect to said lower plate in excess of ninety degrees.

MICHAEL KASSAN.
JOHN W. KASSAN.

REFERENCES CITED

The following references are of record in the file of this patent:

UNITED STATES PATENTS

| Number | Name | Date |
| --- | --- | --- |
| 1,318,308 | Allis | Oct. 7, 1919 |
| 1,656,662 | Carter et al. | Jan. 17, 1928 |
| 1,790,083 | Armstrong | Jan. 27, 1931 |
| 1,952,763 | Lux | Mar. 27, 1934 |
| 1,978,872 | Wharton | Oct. 30, 1934 |
| 1,990,412 | Merritt | Feb. 5, 1935 |
| 2,023,791 | Samuels | Dec. 10, 1935 |
| 2,147,376 | Lucia | Feb. 14, 1949 |